INVENTOR.
ISADORE SHAPIRO

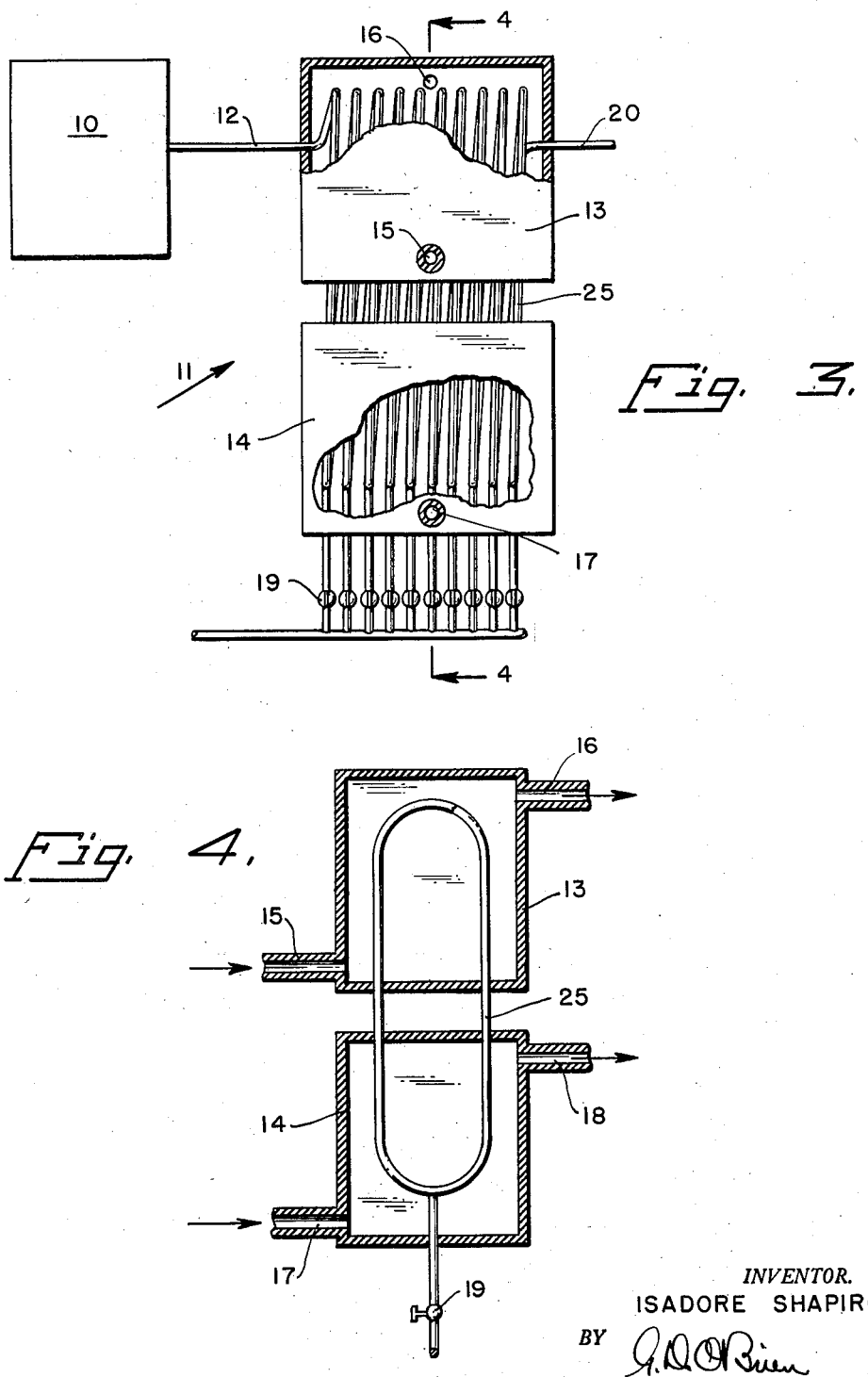

United States Patent Office 2,899,279
Patented Aug. 11, 1959

2,899,279
CONTINUOUS PROCESS FOR PRODUCING DIBORANE

Isadore Shapiro, Pasadena, Calif.

Original application February 6, 1953, Serial No. 335,621, now Patent No. 2,857,248, dated October 21, 1958. Divided and this application February 2, 1956, Serial No. 563,168

1 Claim. (Cl. 23—204)

(Granted under Title 35, U.S. Code (1952), sec. 266)

The invention described herein may be manufactured and used by or for the Government of the United States of America for governmental purposes without the payment of any royalties thereon or therefor.

This invention is a divisional application of application Serial No. 335,621, filed in the U.S. Patent Office on February 6, 1953, now Patent No. 2,857,248.

This invention relates to a continuous process for producing diborane.

Because of the high reactivity of hydrides of boron, their storage during or after production presents a difficult problem. Diborane, for example, reacts violently in the presence of oxygen, and it is necessary that any process for its production be carried out substantially in the absence of air, that is, in a vacuum or in an inert atmosphere. Consequently any process suitable for quantity production of these hydrides must be one requiring a minimum of storage operations, such as those required by stoppages in the production process for the hydride. Other hydrides of boron are made from diborane by cracking processes necessitating its alternate cooling and heating accompanied by precise control of its residence times in the cooling and heating zones. Hence, the desirability of a process in which diborane is produced continuously and passed from the reactor to the cracking apparatus for conversion to other hydrides without the necessity of intermittent storage operations as is required when former discontinuous processes are used.

One of the most convenient processes now available for the production of diborane is that in which lithium aluminum hydride and boron trifluoride in ether are brought together. Heretofore, diborane has been produced by this method in a batch process in which boron trifluoride etherate is added to an excess of lithium aluminum hydride. The process has the disadvantage that when the reactants are brought together in the above order diborane is not produced immediately for reasons which were unknown prior to this invention. Accordingly, the production of diborane by the above method is always accompanied by stoppages as any replenishment of lithium aluminum hydride is always followed by a stoppage in the production of diborane. This makes the process unsuitable for quantity production as the stoppages require a large number of storage operations. The process is also unsuitable for the quantity production of other hydrides of boron from diborane as the stoppages prevent precise control of the residence time of the diborane in the heating and cooling zones of the cracking apparatus.

It is therefore an object of this invention to provide a continuous process for the production of diborane.

It is another object of this invention to provide a continuous process for the production of other hydrides of boron from diborane.

It is still another object of this invention to provide a continuous process for the production of hydrides of boron which is suitable for quantity production.

It has now been found that diborane can be continuously produced by adding lithium aluminum hydride to boron trifluoride etherate in amounts such that the mole ratio of lithium aluminum hydride to boron trifluoride is never in excess of about .75; that other hydrides of boron can be produced continuously from diborane as it is produced in the above process by passing the diborane from the reactor as it is formed through heating and cooling zones of the cracking apparatus, accompanied by control of the residence time of the diborane in these zones as required by the particular hydride which is being produced. In the reactions given herein the boron trifluoride was present as the etherate. For simplicity in writing the equations, the ether formula is omitted.

Fig. 3 is a side elevational view of the cracking apparatus of the invention accompanied by a schematic representation of the reactor;

Fig. 4 is a cross-section of the cracking apparatus taken along the line 4—4 of Fig. 3.

By adding incremental amounts of boron trifluoride etherate to lithium aluminum hydride it was found that two successive reactions are the main steps in the generation of diborane. These are expressed by the equations

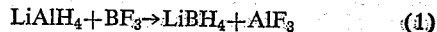

$$LiAlH_4 + BF_3 \rightarrow LiBH_4 + AlF_3 \quad (1)$$

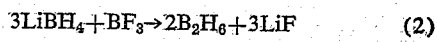

$$3LiBH_4 + BF_3 \rightarrow 2B_2H_6 + 3LiF \quad (2)$$

or in sum

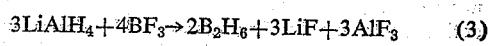

$$3LiAlH_4 + 4BF_3 \rightarrow 2B_2H_6 + 3LiF + 3AlF_3 \quad (3)$$

It was found that the reaction between lithium aluminum hydride and boron trifluoride has precedence over the reaction between lithium borohydride and boron trifluoride. Accordingly, when boron trifluoride is added to an excess of lithium aluminum hydride no boron trifluoride is available for reaction with lithium borohydride to form diborane until all of the lithium aluminum hydride has been converted to lithium borohydride. However, as would be expected from the above, when the order of addition of the reagents is reversed and lithium aluminum hydride is added to an excess of boron trifluoride etherate, diborane is obtained immediately.

Experiments were conducted in accordance with the prior art process to demonstrate the result obtained by the addition of incremental amounts of boron trifluoride to an excess of lithium aluminum hydride. The increments of boron trifluoride were gradually increased until an excess was reached. The results of these experiments are plotted in the graph of Fig. 1 as explained above.

Figure 1:
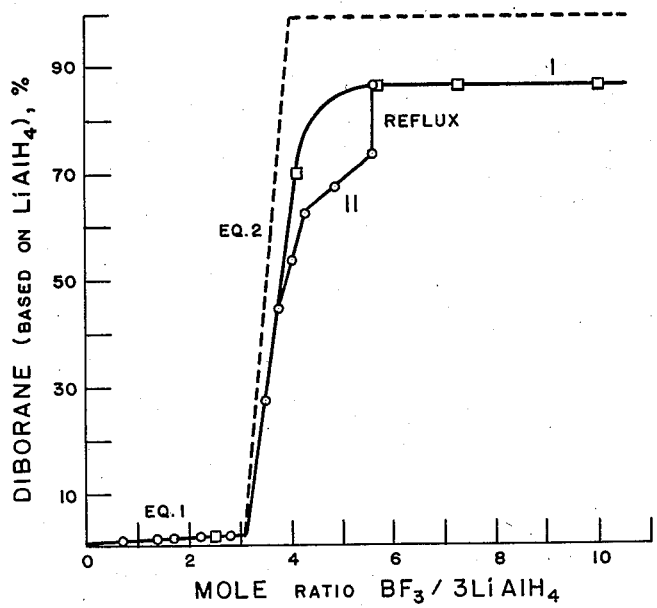
Fig. 1 is a graph of the results obtained by the former procedure of adding boron trifluoride etherate to an excess of lithium aluminum hydride, in which the actual amount of diborane generated as a function of the mole ratio of the reactants at two different temperatures is illustrated graphically by solid lines.

Referring to Fig. 1, the numeral I designates a line representing one series of experiments performed at 24° C. with an initial lithium aluminum hydride concentration of 30 grams in 500 ml. of ether. The line designated by the numeral II represents a second series of experiments performed at 0° C. with an initial lithium aluminum hydride concentration of 16 grams in 300 ml. of ether, reflux at 35° C. The dotted line in the figure represents the theoretical results based on the amounts of reactants used.

Figure 2:
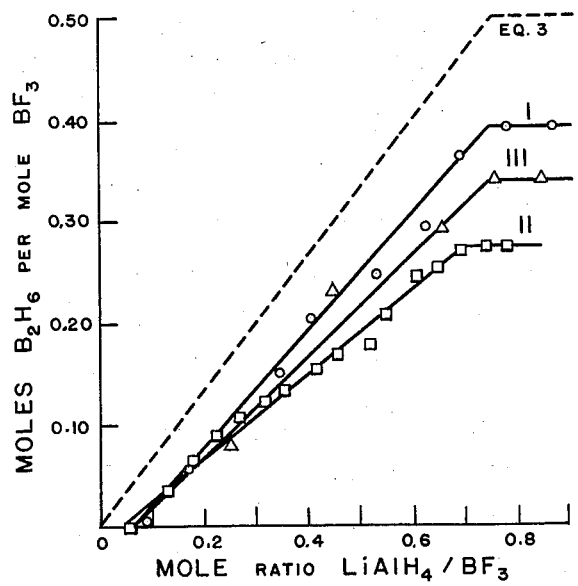
Fig. 2 is a graph of the results obtained by the addition of lithium aluminum hydride to an excess of boron trifluoride etherate, in which is shown the actual amount of diborane generated as a function of the mole ratio of the reactants.

Experiments, which can be considered examples of the present invention, were next performed by incrementally adding lithium aluminum hydride to an excess of boron trifluoride etherate. The results of these experiments are plotted in the graph of Fig. 2 as explained above. Referring to Fig. 2, Roman numeral I designates the line representing experiments conducted at 27.5° C., with initial concentrations of 47.2 grams of boron trifluoride in 400 ml. of ether, 1.18 M LiAlH$_4$; II designates the line representing results obtained from experiments performed at 0° C., initial boron trifluoride etherate concentration of 35.2 grams in 350 ml. ether, 1.14 M LiAlH$_4$; III designates the line representing results from experiments performed at 0° C., initial boron trifluoride etherate concentration of 20.8 grams in 80 ml. of ether, 1.47 M LiAlH$_4$.

The experiments from which the results represented by the graph of Fig. 1 were obtained were performed as follows. Diborane was prepared in conventional type laboratory apparatus. A known volume of boron trifluoride etherate in a closed-system automatic buret was added in small portions to a solution of lithium aluminum hydride in ether which was contained in a three-neck, 2-liter flask. The reaction mixture was agitated continuously by a mercury-sealed stirrer. Predetermined temperatures for the reaction were maintained by a constant temperature bath. Dry nitrogen, introduced slowly into the reaction flask, was used to carry the diborane from the flask through a reflux head (cooled with Dry Ice and acetone) into a condensing trap (cooled with liquid nitrogen). The dry nitrogen flushing was continued for 15 minutes following the addition of each portion of the boron trifluoride etherate. The nitrogen gas escaped from the system through mercury-sealed outlets located just beyond the condensing trap. The reflux was used to prevent the bulk of the ether from being carried along with the diborane. The small amount of ether that did pass through the reflux head later was separated from the diborane.

A similar procedure was used for the generation of diborane by the reverse order of addition of reactants, i.e., the experiments from which the results represented in the graph of Fig. 2 were obtained.

Before each experiment the concentration of lithium aluminum hydride was measured by evaporating to dryness a weighed 10 ml. portion of the solution (to determine the total solids) and analyzing the solid residue for active hydrogen by hydrolysis. Aluminum was determined by precipitation with 8-hydroxyquinoline as a check. Commercial boron trifluoride etherate was purified by distillation at ambient temperature under reduced pressure in an all-glass still. Only the middle one-third portion was used in the experiments. Analysis by prescribed procedures indicated that the etherate was substantially free of impurities. The density of the pure boron trifluoride etherate at 25° C. was measured as 1.125 g./ml. The ethyl ether used was an analytical reagent-grade anhydrous ether which was stored over sodium wire before use. The absence of peroxides in the ether was confirmed by tests with acidified aqueous solutions of potassium iodide. The volume and purity of the diborane generated by each addition of boron trifluoride etherate were determined by the usual high-vacuum techniques. For example, the purity of the diborane was determined by vapor pressure measurements (225 mm. at −111.8° C.). In each case the only impurity found was a trace of ethyl ether which was separated effectively from the diborane by low temperature fractional condensation.

It will be observed from the graph of Fig. 1 that scarcely any diborane is evolved until the mole ratio of boron trifluoride to lithium aluminum hydride approaches 1.00, and that no substantial amount is produced until the ratio approaches about 3. Thereafter, diborane is evolved in proportion to the amount of boron trifluoride added. It was found that the addition of small proportions of boron trifluoride etherate to a solution of lithium aluminum hydride in ether resulted in a vigorous reaction during which a gelatinous precipitate was formed, until the mole ratio of BF$_3$ to LiAlH$_4$ approached 1, when diborane began to evolve. Thereafter the reaction was far less vigorous and the precipitate took on a different appearance, substantiating the conclusion that the generation of diborane by the addition of boron trifluoride to lithium aluminum hydride involves at least two distinct steps such as Equations 1 and 2. In the experiment conducted at 24° C. the excess boron trifluoride in the reaction flask was recovered by separating the solids by filtration, washing with ether, and distilling the combined filtrate and washings. From the quantity of boron trifluoride etherate recovered, it was calculated that the mole ratio of the reactants actually participating in the various reactions was approximately 4.5–5.0 BF$_3$ per 3LiAlH$_4$.

The graph of Fig. 2, representing the results obtained by the addition of lithium aluminum hydride to an excess of boron trifluoride, shows that diborane is given off immediately when the reactants are added in this order. The small period which elapsed before evolution of diborane is believed to be due to a small solubility effect.

An inspection of the curves in Fig. 2 reveals three significant features: (1) The sudden break in the slope of each curve occurs at approximately 0.75 mole of lithium aluminum hydride per mole of boron trifluoride. (2) All curves intersect the abscissa at practically a common point which is removed from the origin (displacement is attributed to some small solubility of diborane). (3) In any one experiment the relative amount of hydride which appears as diborane is approximately constant. This means that the yield of diborane, based upon the increment of lithium aluminum hydride, is nearly constant up to the horizontal part of the curve. Raising the temperature at any earlier point in the process and refluxing at 35° increases this yield; however, raising the temperature after the break in the curve has appeared does not affect the yield of diborane.

A comparison of the two curves for experiments at 0° (Fig. 2) indicates that the yield of diborane is not greatly affected by moderate changes in the starting concentration of the boron trifluoride.

The results plotted in the graph of Fig. 2 demonstrate the effectiveness of the process of the invention for the continuous production of diborane. In conformity with the experiments represented by the graph of Fig. 2, it was found that continuous evolution of diborane can be maintained by replenishment of the reactor with lithium aluminum hydride and boron trifluoride etherate in amounts such that there is always an excess of boron trifluoride etherate in the reactor, preferably in amounts such that the mole ratio of lithium aluminum hydride to boron trifluoride is about .75. The spent solids are removed from the reactor as the operation proceeds.

As is obvious, Equations 1 and 2 are not the only ones which can be postulated to explain the experimental curves in Fig. 1. For example, an equation representing the first stage can be written in which equimolar quantities of lithium aluminum hydride in boron trifluoride give aluminum borohydride and a mixture of lithium fluoride and aluminum fluoride. The second stage can be the reaction of boron trifluoride and aluminum borohydride to give diborane and aluminum fluoride. Regardless of which set of reactions is chosen the overall reaction is that represented by Equation 3, so that the operation of the present invention is the same regardless of which way the reaction goes. However, there was sufficient evidence from the experimental data noted in connection with the above examples to indicate that Equations 1 and 2 are to be preferred over those involving aluminum borohydride. As an illustration, the solid residue containing the latent hydride exhibited physical and chemical characteristics which would be expected if the hydride were lithium borohydride, rather than the aluminum borohydride or its etherate. For example, at no time did any of the residues upon exposure or heating in air exhibit the violent reactivity characteristic of aluminum borohydride.

Another basis for the above choice of reactions is the fact that lithium fluoborate is formed. The postulation of aluminum borohydride as an intermediate would require the formation of lithium fluoborate to occur only during the first stage of the process, whereas if the intermediate is lithium borohydride the fluoborate formation must take place during the second stage. The latter seems to be true, since in Fig. 1 the deviation of the experimental curve from the theoretical curve occurs only during the second stage.

The formation of lithium fluoborate was verified by identification of X-ray patterns (powder photographs taken with filtered Cu radiation) of solids formed during the various experiments made by comparison with patterns of the known compound. It would be reasonable to suppose that lithium fluoborate is formed during the reaction, and acts as a source of boron for the hydridation whenever or wherever the etherate of boron trifluoride is not present in local excess. This idea gains support from an experiment in which a suspension of lithium fluoborate in a solution (in ether) of lithium aluminum hydride was found to yield diborane quite readily.

The formation of lithium fluoborate is further substantiated by other observations which can be made from the results of the experiments. The apparently excess consumption of boron trifluoride which can be inferred from the curves in Fig. 2 is believed to be due to the formation of lithium fluoborate. A break in a curve at any value of, or less than, 0.75 LiAlH₄/BF₃ without complete conversion of hydride to diborane indicates that more boron trifluoride is consumed than would correspond to simple fluoride salts in the end products. This disappearance of boron trifluoride has been attributed to the formation of lithium fluoborate. Again, hydrolysis of a portion of the solids resulting from the above experiments indicated that a portion of the lithium aluminum hydride was still available for the production of diborane. This availability was further indicated by the fact that when small portions of boron trifluoride etherate were added to a previously prepared reaction mixture a large quantity of diborane was evolved. This indicated some utilization of the hydride which had not been converted to diborane in the early stages of the process. Interpretation of this latter case is that part of the boron trifluoride present in the first stage had been converted to some other compound and hence was not available for reaction with the hydride. It appears that the compound was lithium fluoborate.

The present invention is particularly adaptable for the production from diborane of other hydrides of boron by passing diborane directly from the reactor through alternate heating and cooling zones of the cracking apparatus, accompanied by control of residence times in the zones.

In order to illustrate this latter feature of the invention, reference is made to Figs. 3 and 4. The reactor for the production of diborane is shown at 10. It may be of any conventional type provided with means for removal of spent solids. The numeral 11 represents cracking apparatus comprising a series of coils 25 through which diborane is passed directly from the reactor. The coils are connected to the reactor 10 by duct 12. Although coils are used in the present embodiment of the invention for purposes of illustration, other forms of conduits may be used. The upper section of the coils is provided with a heating unit 13 which may be of any conventional type, and cooling unit 14 which may also be of any conventional type. In the modification shown the heating unit is of the fluid heat exchange type in which a heated fluid is circulated through the unit by means of inlet 15 and outlet 16. The cooling unit 14 is also of the heat exchange type with inlet 17 and outlet 18. At 19 are shown outlets for the removal of diborane and at 20 an outlet for removal of by-products of the reaction. In operation, diborane is produced in the reactor 10 by the above continuous process and passes through the coil system so that it travels alternatingly through the heated and cooled sections of the coils, each loop of the coil forming a heater-cooler combination. Depending upon the hydride which is being formed, the residence time in each section is controlled by the velocity at which the gas is forced through the unit. The velocity of the gas, in turn, is controlled by the rate of addition of reactants and the dimensions of the coil.

Known amounts of diborane were subjected to cracking in the apparatus. The heating zones were maintained at 205° C. and the cooling zones at about −40° C. A residence time of two seconds was used. It was found that about 80% of the diborane used up was converted to pentaborane. The pentaborane fraction was almost all $B_5H_9$. By increasing the number of coils and thus the number of heating and cooling stages practically all of the diborane entering the cracking apparatus can be converted to pentaborane.

A short residence time in the heating zones is required to prevent the reaction between the formed pentaborane and unconverted diborane. Pentaborane ($B_5H_9$ and $B_5H_{11}$) is liquid at about −40° C. so that when the cooling zones are maintained at about this temperature it can be readily removed through the removal outlets, the gases present passing on to other heating and cooling areas. The above results demonstrate the effectiveness for producing boron hydrides, of the combination of the above described process for continuous production of diborane with the process for producing other boron hydrides from diborane by controlled residence time of diborane in alternate cooling and heating zones. The cooperative result of the combination derives from the fact that the continuous flow of diborane achieved is particularly adaptable for the regulation of its flow without stoppages through heating and cooling zones in the production of other hydrides of boron.

It is thus seen that there has been provided a process for the continuous production of diborane from lithium aluminum hydride and boron trifluoride. In addition the invention is seen to include the process for continuous production of other hydrides of boron from diborane. Further, the invention comprises efficient apparatus for cracking diborane to produce other hydrides of boron.

Obviously, many modifications and variations of the present invention are possible in the light of the above teachings. It is therefore to be understood that within the scope of the appended claim the invention may be practiced otherwise than as specifically described.

What is claimed is:

A continuous process for making diborane according to the equations $$LiAlH_4 + BF_3 \rightarrow LiBH_4 + AlF_3 \quad (1)$$

$$3LiBH_4 + BF_3 \rightarrow 2B_2H_6 + 3LiF_3 \quad (2)$$

which combined gives $$3LiAlH_4 + 4BF_3 \rightarrow 2B_2H_6 + LiF_3 + 3AlF_3 \quad (3)$$

and in which the reaction of Equation 1 has precedence over that of Equation 2, which comprises first adding boron trifluoride to a reaction vessel followed by the addition thereto of lithium aluminum hydride in an amount such that the mol ratio of lithium aluminum hydride to boron trifluoride is less than .75 based on Equation 3, and continuously replenishing the reaction vessel by the addition thereto of boron trifluoride and tithium aluminum hydride in incremental amounts such that the mol ratio of lithium aluminum hydride to boron trifluoride in the reaction vessel is always less than .75 based on Equation 3; whereby there will always be a stoichiometric excess of boron trifluoride based on Equation 3 in the reaction vessel to permit the reaction of Equation 2 to proceed with the result that diborane is continuously produced.

(References on following page)

References Cited in the file of this patent

UNITED STATES PATENTS 2,553,198    Lesesne _____ May 15, 1951

OTHER REFERENCES

Burg et al.: "Journal of the American Chemical Society," vol. 55, pages 4011–4012 (1933).

Finholt et al.: "Journal of the American Chemical Society," vol. 69, page 1201 (1947).

Shapiro et al.: "Journal of the American Chemical Society," vol. 74, pp. 901–905 (February 20, 1952).

Schlesinger: "Boron Hydrides, Final Report on Contract 1735–10421," Naval Research Laboratory Report #P2964, July 1946 (declassified May 7, 1947), Progress Report XII, pp. 2, 3.

McCarty et al.: "Journal of the American Chemical Society," vol. 73, pages 3138–3143 (July 1951).